Feb. 16, 1954

H. F. DENT 2,669,610

SANITARY ATTACHMENT FÓR TELEPHONES

Filed Jan. 3, 1952

Harold F. Dent
INVENTOR.

BY Clarence A. O'Brien
and Harvey B. Jacobson
Attorneys

Patented Feb. 16, 1954

2,669,610

UNITED STATES PATENT OFFICE 2,669,610

SANITARY ATTACHMENT FOR TELEPHONES

Harold F. Dent, Folcroft, Pa.

Application January 3, 1952, Serial No. 264,764

1 Claim. (Cl. 179—185)

This invention relates generally to sanitary attachments, and more particularly to sanitary attachments adapted to be used on the receiver portion of a telephone.

In the use of an average telephone, it is necessary to place the receiver of the telephone against the ear of the user. In the case of public phones, especially public phone booths, it is well known that the phones are in practically constant use by first one user and then another. Since telephone receivers, especially in public telephones, are generally carelessly cleaned, if at all, there are resulting deposits of perspiration, oils from the skin and hair, cosmetics, etc., which tend to render the receivers unsanitary. Furthermore, it is obvious that all of the users of the phones cannot possibly be free from a skin infection in the vicinity of the ears, and that a user of a telephone having an infected ear will possibly pass germs to the receiver of the telephone. Inasmuch as the telephone is quite often immediately picked up by another user, the germs are at times passed on to the next user, with the result that he finds he has an infected ear a few days later.

The primary object of this invention is to provide an improved sanitary attachment for use with telephone receivers, the sanitary attachment being disposable and used by only its original user.

Another object of this invention is to provide an improved sanitary attachment for a telephone receiver which may be easily attached to and be removed from a telephone receiver.

Another object of this invention is to provide an improved sanitary attachment for a telephone receiver which is of simple construction and made of a fibrous material, so that it may be manufactured at an extremely low cost.

A further object of this invention is to provide an improved sanitary attachment for telephone receivers which is provided with a cushioned portion adapted to resiliently engage the ear of a user.

These, together with various ancillary features and objects of the invention which will later become apparent as the following description proceeds, are obtained by the present invention, a preferred embodiment of which has been illustrated by way of example only in the accompanying drawings, wherein.

Figure 1:
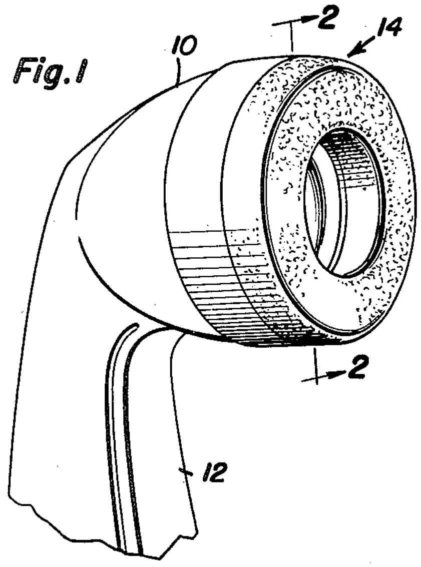
Figure 1 is a perspective view of the sanitary attachment which is the subject of this invention, and showing the attachment mounted on the receiver of a conventional telephone.

Referring now more specifically to the accompanying drawings, wherein like numerals designate similar parts throughout the various views, it will be seen that the novel sanitary attachment which is the subject of this invention is shown in Figure 1 as being applied to the receiver 10 of a conventional telephone 12.

Figure 2:
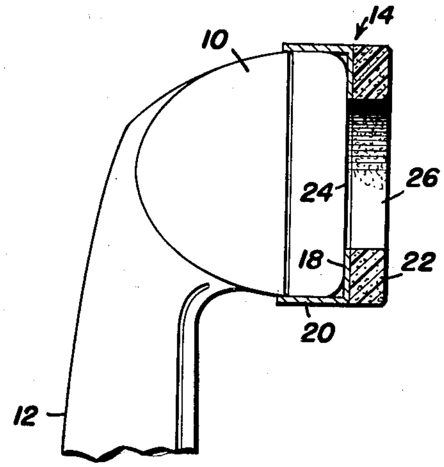
Figure 2 is a transverse vertical sectional view of the sanitary attachment taken substantially upon the plane indicated by the section line 2—2 of Figure 1 and showing the manner in which the sanitary attachment is secured to the receiver of a telephone.
Figure 3:
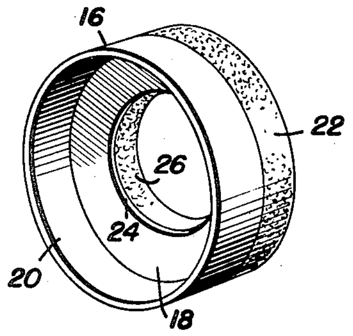
Figure 3 is a rear perspective view of the sanitary attachment which is the subject of this invention.

Referring now to the modification illustrated in Figures 1, 2 and 3, it will be seen that the sanitary attachment is referred to generally by the reference numeral 14. The sanitary attachment 14 includes a cup 16 having a bottom wall 18 and a cylindrical side wall 20. Secured to the outer surface of the bottom 18 is a sponge cushion 22 of the same diameter as the cup 16. The bottom 18 of the cup 16 and the sponge cushion 22 are provided with aligned apertures 24 and 26, respectively.

Referring now to Figure 2, it will be readily seen that the internal diameter of the cup 16 is substantially equal to the external diameter of the receiver 10 of a telephone 12 so that when the sanitary attachment 14 is mounted on the receiver 10, the side wall 20 of the cup 16 tightly engages the exterior surface of the receiver 10 and retains the sanitary attachment 14 thereon.

Figure 4:
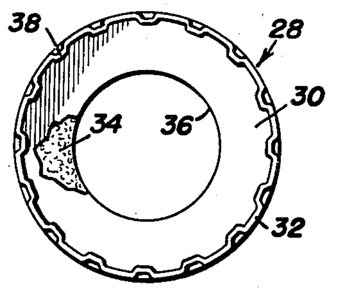
Figure 4 is a rear elevational view of a modified form of sanitary attachment, parts being broken away to show the cushion portion thereof.

Referring now to Figure 4, it will be seen that there is illustrated a modified form of sanitary attachment for telephones which will be referred to generally by the reference numeral 28. The sanitary attachment 28 consists of a cup-shaped member having a bottom wall 30 and a cylindrical side wall 32. Secured to the outer surface of the bottom wall 30 is a sponge cushion 34. An enlarged opening is formed in the bottom wall 30 and the cushion 34. The enlarged opening is for the purpose of passing sound from a telephone receiver and is referred to by the reference numeral 36.

In order that the sanitary attachment 28 may be adapted to fit over a plurality of telephone receivers 10 of different diameters, the side wall 32 of the cup portion is crimped to form a plurality of inwardly extending corrugations 38. When the sanitary attachment 28 is attempted to be placed over a receiver of a telephone, the side wall 32 expands to substantially the same diameter as the telephone receiver, and the corrugations 38 are flattened out and, if necessary, become flush with the outer surface of the side wall 32.

It is the intention of this invention to form the sanitary attachments 14 and 28 of a fibrous material so that they may be manufactured at a relatively low cost. It is a further intention of this invention that the cost of the sanitary attachments be so small that they may be dispensed from a machine adjacent the public telephone in the same manner as are paper drinking cups adjacent a public fountain. However, if it is desired that a number of the sanitary attachments be marketed at one time, they may be easily packaged.

Since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claim.

Having described the invention, what is claimed as new is:

A sanitary attachment for telephones comprising a cup adapted to be disposed over a receiver of a telephone, said cup having a bottom wall including an outer surface, a sponge layer carried by the bottom wall of the cup on said outer surface, aligned openings through the bottom of the cup and the sponge layer, said sponge layer and said cup being formed of a fibrous material and being disposable, said cup having side walls being crimped so as to be adapted to resiliently engage the receiver of a telephone.

HAROLD F. DENT.

References Cited in the file of this patent

UNITED STATES PATENTS

| Number | Name | Date |
|---|---|---|
| 1,489,978 | Byron | Apr. 8, 1924 |
| 1,648,832 | Urban | Nov. 8, 1927 |
| 2,544,267 | Konvalinka | Mar. 6, 1951 |
| 2,593,382 | Zimmermann | Apr. 15, 1952 |

FOREIGN PATENTS

| Number | Country | Date |
|---|---|---|
| 716,666 | France | Oct. 12, 1931 |